(12) United States Patent
Sasaki et al.

(10) Patent No.: US 7,069,907 B2
(45) Date of Patent: Jul. 4, 2006

(54) COMPRESSION IGNITION INTERNAL COMBUSTION ENGINE

(75) Inventors: Satoru Sasaki, Kariya (JP); Tsukasa Kuboshima, Okazaki (JP); Kanehito Nakamura, Ichinomiya (JP); Masumi Kinugawa, Okazaki (JP); Yasuhiro Kariya, Obu (JP); Tokuji Kuronita, Kariya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 10/979,179

(22) Filed: Nov. 3, 2004

(65) Prior Publication Data

US 2005/0092286 A1    May 5, 2005

(30) Foreign Application Priority Data

Nov. 4, 2003  (JP) .............................. 2003-373923
Aug. 26, 2004  (JP) .............................. 2004-247103

(51) Int. Cl.
  *F02B 15/00* (2006.01)
(52) U.S. Cl. .................................. 123/432; 123/568.21
(58) Field of Classification Search ........ 123/299–301, 123/432, 435, 501, 502, 546, 564, 568.11, 123/568.21, 704
  See application file for complete search history.

(56) References Cited

U.S. PATENT DOCUMENTS 5,827,150 A * 10/1998 Mukumoto .................. 477/101
6,446,597 B1 * 9/2002 McAlister .................... 123/297
2003/0012985 A1 * 1/2003 McAllister .................... 429/12

FOREIGN PATENT DOCUMENTS

JP        2864896        12/1998
JP        2001-165017    6/2001

* cited by examiner

*Primary Examiner*—John T. Kwon
(74) *Attorney, Agent, or Firm*—Nixon & Vanderhye PC

(57) ABSTRACT

A compression ignition engine injects fuel through injection holes of an injector at a substantially constant injection rate to atomize the fuel so that the fuel can be easily vaporized and to make the fuel penetrate an atmosphere inside a cylinder. A spatial distribution of the injected fuel in which mixing of the fuel and air is promoted as the fuel recedes from the injection hole and the fuel reaches a premixing space where the fuel is premixed with the air is provided. The engine controls oxygen concentration inside the cylinder and an ignition delay so that a ratio of a quantity of the fuel injected before a start of ignition to a total fuel injection quantity falls within a range from 25% to 50% and so that the premixed gas formed in the premixing space is combusted serially.

17 Claims, 10 Drawing Sheets

FIG. 14
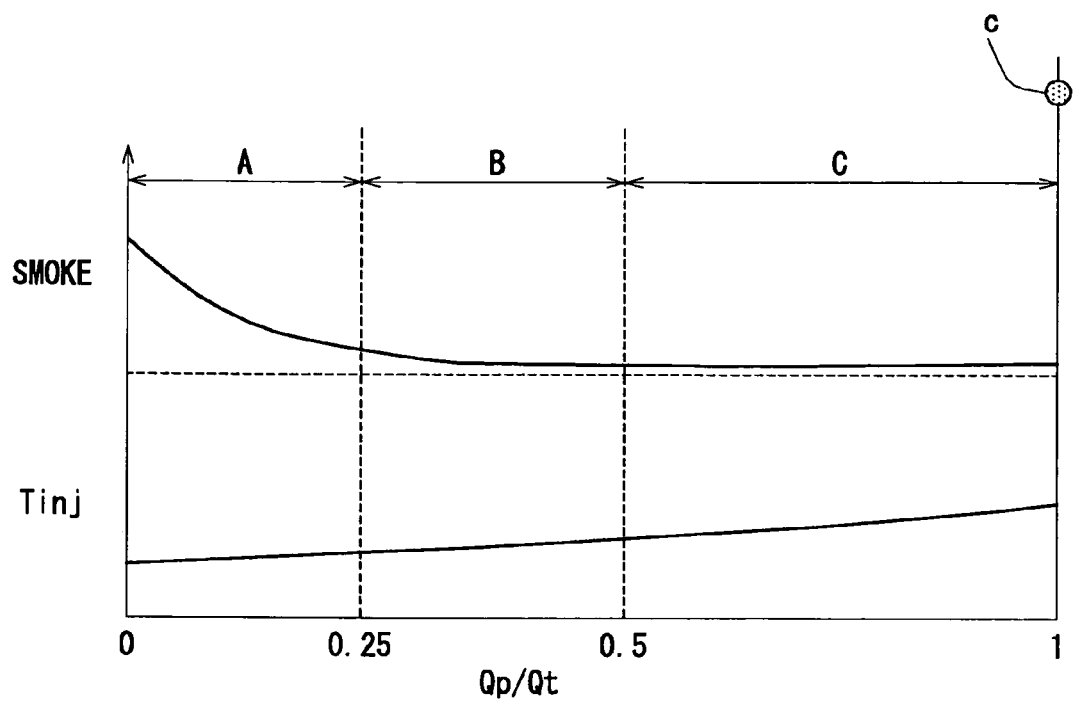
FIG. 15A    FIG. 15B    FIG. 15C
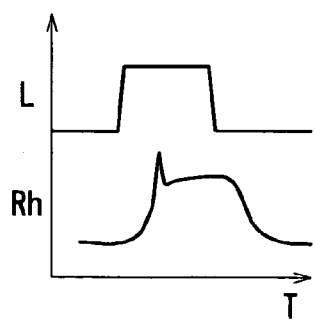
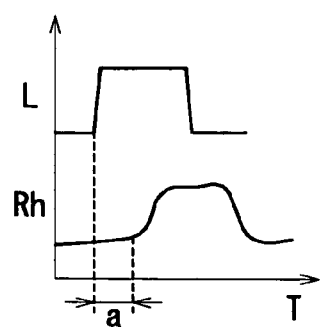
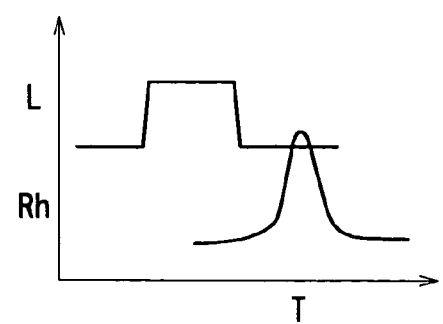

COMPRESSION IGNITION INTERNAL COMBUSTION ENGINE

CROSS REFERENCE TO RELATED APPLICATION

This application is based on and incorporates herein by reference Japanese Patent Applications No. 2003-373923 filed on Nov. 4, 2003 and No. 2004-247103 filed on Aug. 26, 2004.

BACKGROUND OF THE INVENTION

1. Field of the Invention

The present invention relates to a compression ignition internal combustion engine.

2. Description of Related Art

In a compression ignition internal combustion engine, fuel injected from an injector in the form of liquid droplets is atomized and vaporized, and is mixed with air to form a combustible mixture gas. Then, the combustible mixture gas is ignited. Thus, the fuel is combusted in the compression ignition internal combustion engine. The injected fuel reaches a combustible state after the fuel is atomized and the combustible mixture gas is formed. Therefore, ignition timing lags behind fuel injection timing. More specifically, an ignition delay exists between the fuel injection timing and the ignition timing. Generally, in the combustion, premixed combustion occurs first, and then, diffusion combustion, of which speed is limited by mixing speed of the fuel and the air, occurs. In an early stage of the combustion (or in the premixed combustion), the fuel and the air are mixed sufficiently uniformly and the combustion occurs rapidly. Therefore, a heat release rate pattern in the combustion process has a peak in the early stage of the combustion, at which the heat release rate rises largely.

In recent years, reduction of exhaust emission and noise of the internal combustion engine has been emphasized more and more, in addition to improvement of motive performance. Exhaust gas recirculation (EGR) for recirculating exhaust gas into an intake system is well known as one of the technologies for reducing the exhaust emission. The premixed combustion causes the rapid combustion and increases temperature inside a cylinder. Therefore, the EGR is performed to reduce oxygen concentration so that an excessive increase of temperature inside the cylinder is prevented. Thus, nitrogen oxides can be reduced.

If the EGR is performed, the nitrogen oxides can be reduced but the decrease of the oxygen concentration is inevitable. Accordingly, smoke can be easily generated in the diffusion combustion, in which the fuel and the air are not mixed sufficiently. Therefore, a technology disclosed in Japanese Patent Publication No. 2864896 (Patent Document 1) retards the fuel injection timing till after a top dead center (TDC) to extend the ignition delay when the EGR is performed so that the generation of the smoke is inhibited. This technology extends the ignition delay extraordinarily so that the entity of the injected fuel is brought to the premixed state before the ignition.

In a technology disclosed in Unexamined Japanese Patent Application Publication No. 2001-165017 (Patent Document 2), multiple injection holes are formed and a passage area of each injection hole is reduced. Thus, the mixed state of the fuel and the air can be improved efficiently.

However, in the technology disclosed in Patent Document 1, the ignition is started after the entity of the injected fuel reaches the premixed state. Therefore, a large amount of the fuel is combusted at once. Accordingly, the heat release rate rises at once, and then, decreases rapidly. A heat release rate pattern provides a peak-shaped profile as a whole. Therefore, the noise increases. The fuel injected in the early stage of the injection diffuses during the long ignition delay. Accordingly, there is a possibility that the mixed gas becomes excessively lean and hydrocarbon or carbon monoxide is generated. Since the injection timing is retarded and the ignition delay is extended extraordinarily, the influence on the efficiency is inevitable, and fuel consumption is deteriorated.

The technology disclosed in Patent Document 2 promotes the atomization of the fuel and can shorten the ignition delay. However, even if the technology of Patent Document 2 is applied to the technology of Patent Document 1, the overall peak-shaped profile of the heat release rate pattern cannot be changed. As a result, the reduction of the nitrogen oxides or the smoke cannot be achieved at the same time as the improvement of the noise prevention ability and the fuel consumption.

SUMMARY OF THE INVENTION

It is therefore an object of the present invention to provide an internal combustion engine capable of reducing exhaust emission such as nitrogen oxides or smoke and of improving noise prevention ability and fuel consumption at the same time.

According to an aspect of the present invention, a compression ignition engine having an exhaust gas recirculation system for recirculating exhaust gas into an intake system includes supplying means and controlling means. The supplying means injects fuel through injection holes at a substantially constant injection rate to atomize the fuel so that the fuel can be easily vaporized and to make the fuel penetrate an atmosphere inside a cylinder of the engine. Thus, the supplying means provides a spatial distribution of the injected fuel in which mixing of the fuel and air progresses as the fuel recedes from the injection hole along an injection direction and the fuel reaches a premixing space where the fuel is premixed with the air. The controlling means performs combustion control. In the combustion control, the controlling means controls oxygen concentration inside the cylinder so that a combustion space, in which the fuel is combusted, coincides with the premixing space. Meanwhile, the controlling means controls a period from injection timing to ignition timing of the fuel so that the fuel is ignited while the fuel is injected and so that a ratio of a quantity of the fuel injected before a start of the ignition to a total quantity of the fuel injected during the one injection falls within a predetermined range.

In the spatial distribution of the injected fuel, the mixing of the fuel and the air progresses as the fuel recedes from the injection hole along the injection direction and the fuel reaches the premixing space where the fuel is premixed with the air. The oxygen concentration inside the cylinder and the period from the injection timing to the ignition timing (the ignition delay) are controlled so that the combustion space coincides with the premixing space. Thus, the heat release rate pattern provides a profile having no peak. Thus, the combustion decreasing the noise and inhibiting the generation of the smoke can be realized.

Moreover, the ratio of the quantity of the fuel injected before the start of the ignition (the pre-ignition injection quantity) to the total injection quantity falls within the predetermined range. Therefore, the ignition delay is shortened as the total injection quantity decreases. Therefore, the scale of the premixing space at the time when the fuel is ignited decreases as the total injection quantity decreases. Meanwhile, a combustion amount per unit time decreases and the noise decreases. When an only small quantity of the fuel is required as the total injection quantity, the noise prevention ability of the engine is highly required. The combustion corresponding to the requirement of the noise prevention ability can be performed.

According to another aspect of the present invention, the supplying means is formed so that the adjacent injection holes form an injection hole group, wherein central lines of the injection holes belonging to the same injection hole group are directed in substantially the same direction.

Since the number of the injection holes is increased, a passage sectional area of each injection hole is decreased and the atomization is promoted. In each injection hole group, the fuel is injected through adjacent injection holes in substantially the same direction. Therefore, the injection hole group exerts a high penetration force of the fuel like a single injection hole having a large passage sectional area. Thus, the improvement of the atomization ability and the penetration force of the injected fuel can be achieved by the nozzle structure alone at the same time.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

FIG. 14 is a graph showing characteristics of the engine according to the embodiment;

FIG. 15A is a graph showing a heat release rate pattern of the engine according to the embodiment;

FIG. 15B is a graph showing a heat release rate pattern of the engine according to the embodiment;

FIG. 15C is a graph showing a heat release rate pattern of the engine according to the embodiment;

DETAILED DESCRIPTION OF THE REFERRED EMBODIMENT

Figure 1:
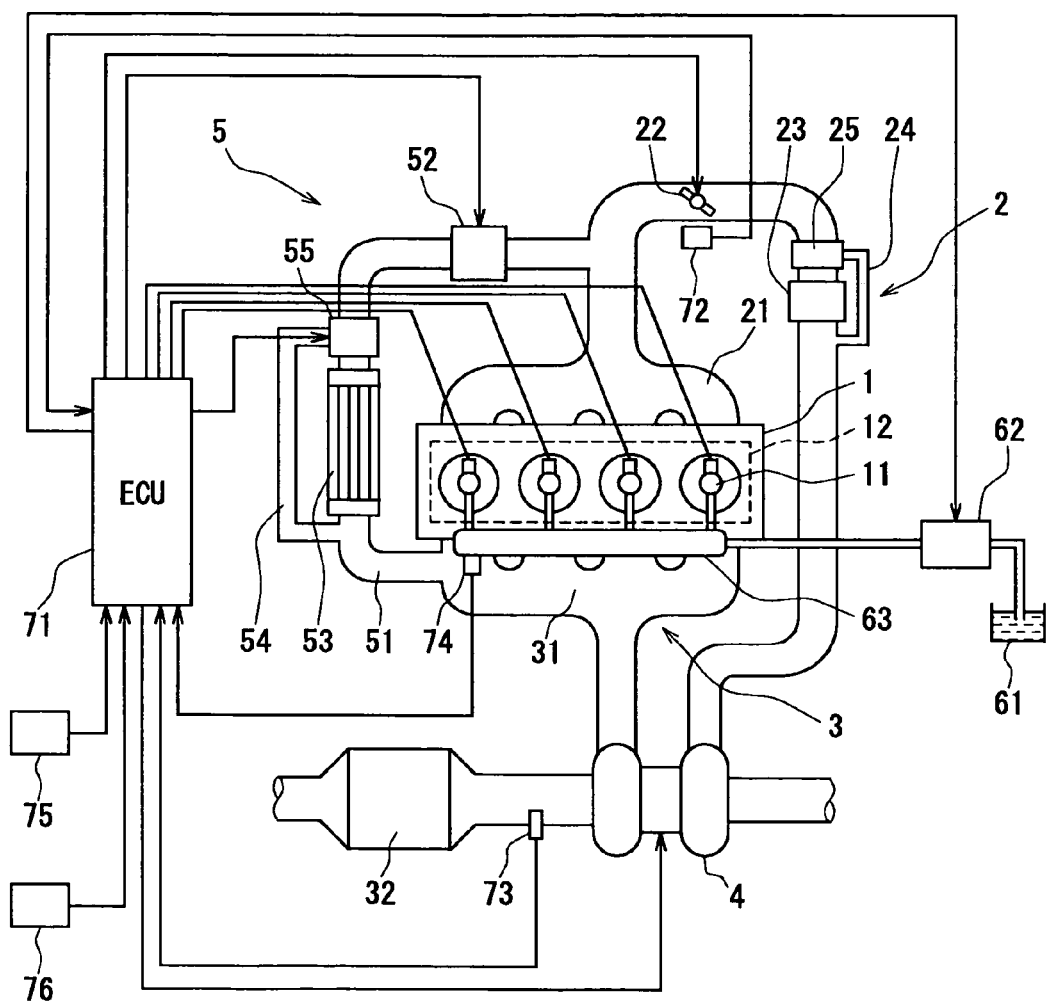
FIG. 1 is a schematic diagram showing an internal combustion engine according to an embodiment of the present invention.

Referring to FIG. 1, a compression ignition engine having a fuel control system according to an embodiment of the present invention is illustrated. The present embodiment is applied to an automobile, for instance. The engine shown in FIG. 1 is a four-cylinder engine. Air is supplied into respective cylinders of an engine main body 1 from an intake system 2 and the air is consumed in combustion of the fuel. An intake manifold 21 communicating with the respective cylinders is disposed in a downstream end of the intake system 2. Intake quantity of the air is defined by an opening degree of a throttle valve 22. A variable valve mechanism 12 for regulating opening timing and closing timing of intake valves and exhaust valves is mounted to the engine main body 1.

Injectors 11 as supplying means are mounted to the respective cylinders on a one-on-one basis. The injector 11 injects the fuel when the injector 11 is open. The fuel is supplied from a common rail 63, which is common to the cylinders, to the injectors 11. A fuel pressure-feeding device 62 having a high-pressure supply pump, which pressure-feeds low-pressure fuel drawn from a fuel tank 61, supplies the fuel into the common rail 63. Thus, the fuel in the common rail 63 is held at a high pressure. The pressure of the fuel in the common rail 63 (a common rail pressure) defines an injection pressure of the injectors 11. The common rail pressure is regulated by controlling the fuel pressure-feeding device 62.

Figure 2:
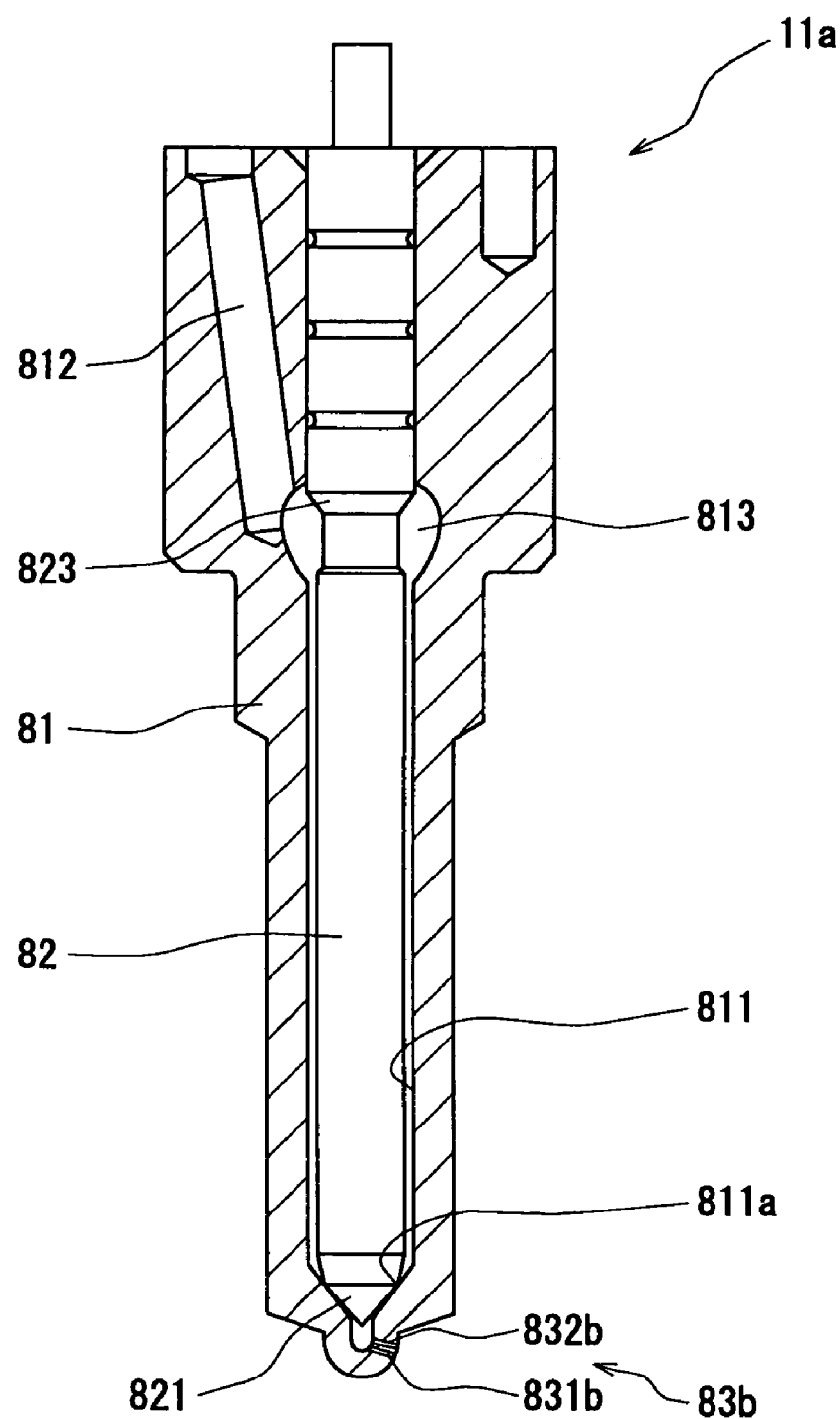
FIG. 2 is a sectional view showing a nozzle of an injector of the engine according to the embodiment.
Figure 3:
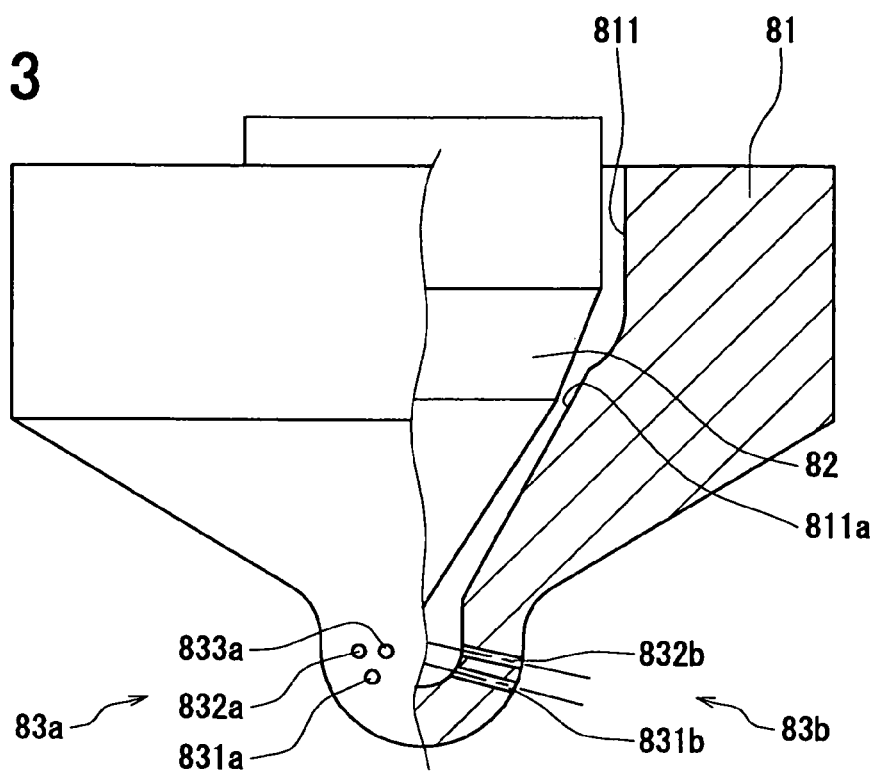
FIG. 3 is a fragmentary sectional view showing a substantial part of the nozzle according to the embodiment.

A nozzle 11a of the injector 11 is shown in FIGS. 2 and 3. The nozzle 11a includes a nozzle body 81 in the shape of a round bar and a needle 82 as shown in FIG. 2. The nozzle body 81 is formed with a longitudinal hole 811, which is bored along a central axis of the nozzle body 81, and the needle 82 is slidably accommodated inside the longitudinal hole 811. An internal diameter of a middle portion of the longitudinal hole 811 is enlarged to provide a fuel sump 813 as shown in FIG. 2. An upper portion of the needle 82 above the fuel sump 813 in FIG. 2 is slidably held inside the longitudinal hole 811. The high-pressure fuel is introduced from the common rail 63 into the fuel sump 813 through a high-pressure passage 812, and reaches a lower end of the longitudinal hole 811. A seat 811a is formed at the lower end of the longitudinal hole 811. A needle tip 821 of the needle 82 is seated on the seat 811a. If the needle tip 821 lifts from the seat 811a, the fuel is injected through injection holes 831a, 832a, 833a, 831b, 832b. The needle 82 is formed with a stepped surface 823 facing downward in FIG. 2 in the fuel sump 813. A pressure of the high-pressure fuel acts on the stepped surface 823 in an upward direction in FIG. 2, or in a lifting direction of the needle 82. The injector 11 includes biasing means for biasing the needle 82 downward. If the downward biasing force of the biasing means is eliminated, the needle 82 lifts.

The multiplicity of injection holes 831a–832b is formed at a tip of the nozzle body 81. More specifically, three injection holes 831a, 832a, 833a disposed in proximity to each other on apexes of a regular triangle provide an injection hole group 83a. Likewise, another three injection holes 831b, 832b provide another injection hole group 83b (the other injection hole of the injection hole group 83b is not shown in FIG. 3). Thus, three injection holes provide one injection hole group. The nozzle body 81 is also formed with other injection hole groups, in addition to the injection hole groups 83a, 83b. For instance, six injection hole groups are disposed along a circumference of the nozzle body 81 at an equal interval. Central lines of the injection holes of each injection hole group are formed in substantially parallel with each other as shown in FIG. 3. A diameter of each one of the injection holes 831a–832b is set substantially in a range from 0.05 millimeter to 0.1 millimeter.

If the fuel is injected through the injection holes 831a–832b of the nozzle 11a, the fuel is injected substantially in the same direction for each one of the injection hole groups 83a, 83b. Thus, the fuel injected through each one of the injection hole groups 83a, 83b forms a spray. Therefore, each one of the injection hole groups 83a, 83b exerts a high penetration force of the fuel like a single injection hole having a large passage sectional area. Moreover, atomization of the fuel is promoted because the passage sectional area of each one of the injection holes 831a–832b is small.

The exhaust gas generated by combusting the injected fuel is discharged to the ambient air through an exhaust system 3. The exhaust system 3 includes an exhaust manifold 31, whose upstream ends communicate with the entire cylinders, and a trap filter 32 for collecting particulate matters included in the exhaust gas.

As shown in FIG. 1, the engine includes a turbocharger 4 for compulsorily introducing the air into the engine main body 1 with the use of waste heat of the exhaust gas discharged to the exhaust manifold 31.

As shown in FIG. 1, the engine includes an exhaust gas recirculation system (an EGR system) 5 for recirculating part of the exhaust gas from the exhaust system 3 into the intake system 2 through an EGR passage 51 connecting the intake system 2 with the exhaust system 3. An EGR rate is regulated by regulating a flow rate of the recirculated exhaust gas (EGR gas) with the use of an EGR valve 52, whose opening degree can be set arbitrarily. An EGR cooler 53 is disposed in the EGR passage 51 and cools the EGR gas before the EGR gas is taken into the intake system 2.

The EGR gas can bypass the EGR cooler 53 by flowing through a bypass passage 54. The bypass passage 54 merges into the EGR passage 51 at a merging point downstream of the EGR cooler 53. A switching valve 55 is disposed at the merging point. The switching valve 55 switches between an operation state in which the EGR gas is recirculated to the intake system 2 through the EGR cooler 53, and another operation state in which the EGR gas bypasses the EGR cooler 53 and is recirculated to the intake system 2 through the bypass passage 54 (not through the EGR cooler 53).

The intake system 2 includes an intercooler 23. The intercooler 23 is disposed between a compressor of the turbocharger 4 and the throttle valve 22. The intercooler 23 cools the intake air supercharged by the turbocharger 4. The intake air can bypass the intercooler 23 by flowing through a bypass passage 24. The bypass passage 24 merges into the intake passage at a merging point downstream of the intercooler 23. An intercooler switching valve 25 is disposed at the merging point. The intercooler switching valve 25 switches between an operation state in which the intake air is introduced into the intake manifold 21 through the intercooler 23 and another operation state in which the intake air bypasses the intercooler 23 and is introduced into the intake manifold 21 through the bypass passage 24.

An electronic control unit (ECU) 71 controls the fuel injection based on an operating state of the engine sensed by sensors mounted to various portions of the engine. The sensors include a throttle position sensor 72 for sensing an opening degree of the throttle valve 22 (a throttle opening degree), and an air fuel ratio sensor 73 for sensing oxygen concentration of the exhaust gas. A pressure sensor 74 for sensing the common rail pressure is mounted to the common rail 63. The engine includes rotation speed sensor 75 for sensing engine rotation speed NE, an accelerator position sensor 76 for sensing an accelerator position and other sensors commonly used in the diesel engine.

The ECU 71 includes various signal processing circuits and calculation circuits. For instance, the ECU 71 is structured centering on a microcomputer.

The ECU 71 uses the sensed throttle opening degree as a value of torque required by a vehicle driver, and sets a command value of the fuel injection quantity in accordance with the throttle opening degree. The ECU 71 controls the injectors 11. More specifically, the ECU 71 opens the injector 11 at predetermined timing for a predetermined period to inject the fuel. The ECU 71 controls the fuel pressure-feeding device 62 so that the sensed common rail pressure coincides with a target pressure. The ECU 71 controls the EGR valve 52, the switching valve 55, the intercooler switching valve 25, the variable valve timing mechanism 12, and the like, in accordance with the operating state.

Next, combustion control performed by the ECU 71 as controlling means will be explained. The control is selectively performed in a predetermined operation area (explained after).

Firstly, the oxygen concentration inside the cylinder is set by controlling the EGR rate (Rr). Characteristics of nitrogen oxides, smoke, noise, fuel consumption, and an ignition delay (a period from injection timing to ignition timing) with respect to the EGR rate Rr in the case where an injection timing Tinj is set at a top dead center (TDC) are shown by a solid line "a", a broken line "b", a solid line "c", a broken line "d" and a solid line "e" in FIG. 4 respectively. If the EGR rate Rr increases, the oxygen concentration decreases and excessive activation of the combustion in a combustion space after the ignition can be prevented. Accordingly, an excessive increase of combustion temperature can be inhibited. Therefore, the nitrogen oxides decrease as the EGR rate Rr increases as shown by the solid line "a" in FIG. 4. In this case, the noise is also reduced as shown by the solid line "c", since the excessive activation of the combustion is prevented. If the EGR rate Rr increases, the oxygen becomes insufficient in the combustion space, and the smoke is deteriorated (increased) as shown by the broken line "b". Therefore, the EGR rate Rr is determined in accordance with the nitrogen oxides, the noise and the smoke, among which a trade-off exists. The EGR rate Rr is determined also in accordance with other factors. The EGR rate Rr is set at 35% (as shown by a point C1 in FIG. 4), for instance.

Figure 6:
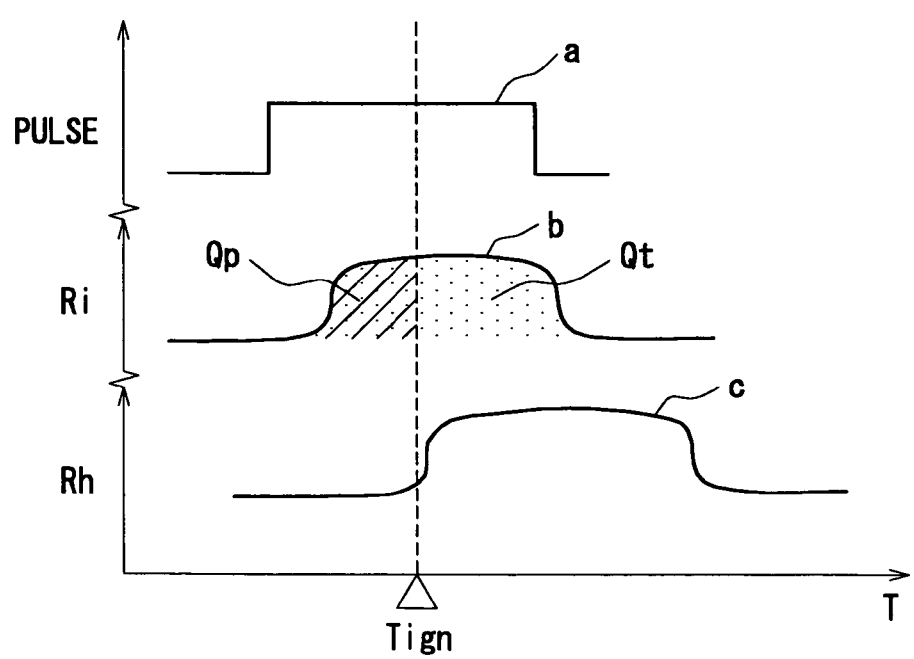
FIG. 6 is a time chart showing a fuel injection operation of the engine according to the embodiment.

Secondly, the ignition delay is set by controlling the injection timing Tinj, at which the injection is started, and the like as follows. The ignition delay is set so that the ignition timing is posterior to the TDC and a ratio of a pre-ignition injection quantity Qp to a total injection quantity Qt falls within a predetermined range (a range from 25% to 50%, for instance). The pre-ignition injection quantity Qp and the total injection quantity Qt are defined as follows. If an injection pulse (PULSE) as a valve opening control signal of the injector 11 is outputted once as shown by a solid line "a" in FIG. 6, an injection rate Ri, whose temporal profile is in the shape of a trapezoid, is provided as shown by a solid line "b". A temporal profile of a heat release rate Rh (a heat release rate pattern) in various shapes corresponding to control conditions and the like is provided as shown by a solid line "c" in FIG. 6. The pre-ignition injection quantity Qp is a quantity of the fuel injected in a period from the injection timing Tinj to the ignition timing Tign, from which the heat release rate Rh rises. The total injection quantity Qt is a total quantity of the fuel injected in accordance with one injection pulse.

The ignition delay mainly depends on the cylinder temperature and the cylinder pressure. If the cylinder temperature and the cylinder pressure increase, the ignition delay is shortened. Therefore, the ignition delay is set by controlling at least one of the injection timing Tinj affecting the cylinder temperature, temperature of the gas taken into the cylinder (cylinder intake gas temperature), temperature of the EGR gas, a compression ratio, a supercharging pressure affecting the cylinder pressure, and the injection pressure. Characteristics of the nitrogen oxides, the smoke, the noise, the fuel consumption and the ignition delay with respect to the injection timing Tinj in the case where the EGR rate is 35% are shown by a solid line "a", a broken line "b", a solid line "c", a broken line "d", and a solid line "e" in FIG. 7 respectively. Generally, the ignition delay is minimized when the injection timing Tinj is set at a certain angle prior to the TDC, and the ignition delay increases as the injection timing Tinj is advanced or retarded from the certain angle as shown by the solid line "e" in FIG. 7. If the ignition delay is minimized, the ignition is started near the TDC. If the injection timing Tinj is prior to the TDC, the temporal profile of the heat release rate Rh has a large peak at an early stage of the combustion as shown in FIG. 8A. The profile shown in FIG. 8A is provided when the injection timing Tinj is set at a value A2 in FIG. 7. If the injection timing Tinj approaches the certain angle, at which the ignition delay is minimized, the peak is reduced as shown in FIG. 8B, and finally, the temporal profile of the heat release rate Rh is changed to the trapezoidal shape shown in FIG. 8C. The profile shown in FIG. 8B is provided when the injection timing Tinj is set at a value B2 in FIG. 7. The profile shown in FIG. 8C is provided when the injection timing Tinj is set at a value C2 in FIG. 7.

Figure 7:
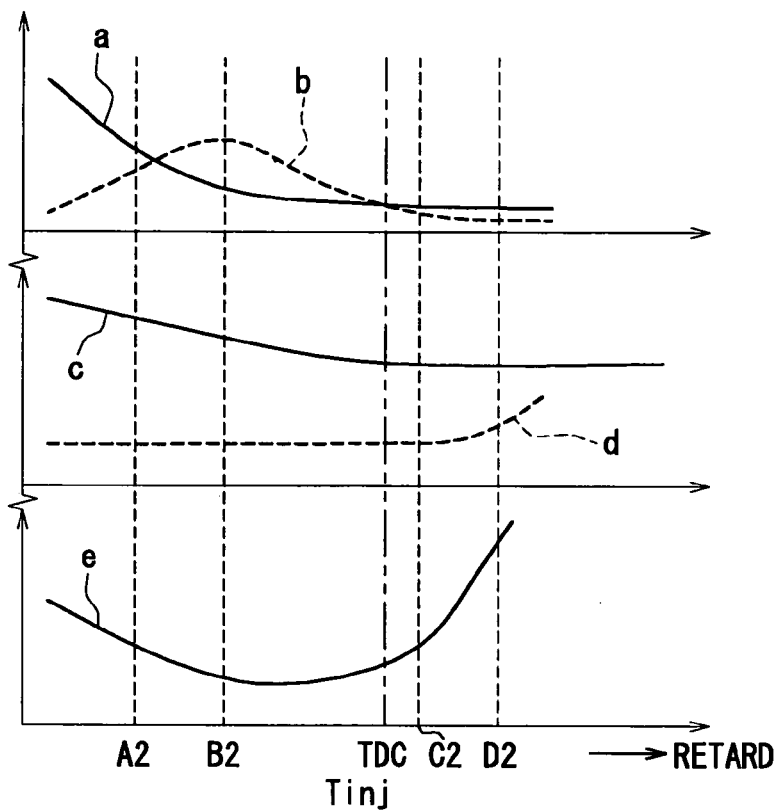
FIG. 7 is a graph showing characteristics of the engine according to the embodiment.
Figure 8A:
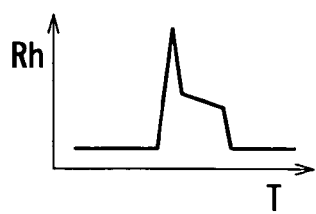
FIG. 8A is a time chart showing a heat release rate pattern of the engine according to the embodiment.
Figure 8B:
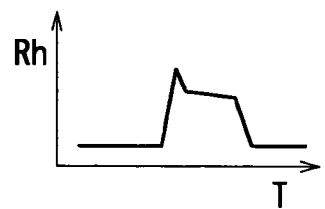
FIG. 8B is a time chart showing a heat release rate pattern of the engine according to the embodiment.
Figure 8C:
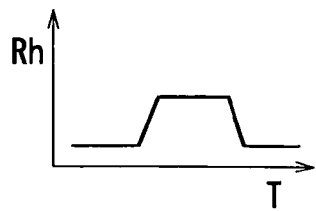
FIG. 8C is a time chart showing a heat release rate pattern of the engine according to the embodiment.

When the injection timing Tinj is set at the certain angle, at which the ignition delay is minimized, the smoke is most deteriorated (increased) as shown by the broken line "b" in FIG. 7. The smoke is improved (decreased) as the injection timing Tinj is advanced or retarded from the certain angle. Therefore, the injection timing Tinj is set so that the ignition timing Tign is posterior to the TDC and the ignition delay falls within the predetermined range.

The EGR gas temperature, the cylinder intake gas temperature, the compression ratio, the supercharging pressure and the injection pressure can be employed as parameters for regulating the ignition delay, in addition to the injection timing Tinj. By turning the switching valve 55 to the bypass passage 54 side to prevent the EGR gas from flowing through the EGR cooler 53, the EGR gas can be supplied into the cylinder while substantially preventing the decrease in the EGR gas temperature. Thus, even if the exhaust gas temperature is low during a cold period or a low-load period, the excessive decrease of the EGR gas temperature can be prevented.

The cylinder intake gas temperature is temperature of the gas, which is mixture of the EGR gas and fresh air and is taken into the cylinders through the intake manifold 21. The ignition delay control is directly affected by the temperature of the gas made by mixing the fresh air passing through the throttle valve 22 and the EGR gas provided through the EGR passage 51. Therefore, the cylinder intake gas temperature is controlled as the parameter for controlling the ignition delay. The cylinder intake gas temperature is controlled based on the fresh air temperature and the EGR gas temperature. The fresh air temperature and the EGR gas temperature can be controlled by switching the switching valves 25, 55 of the bypass passages 24, 54, respectively.

The compression ratio is regulated by controlling the valve closing timing of the intake valve. As the compression ratio increases, the cylinder temperature increases.

The cylinder pressure is regulated by controlling the supercharging pressure of the turbocharger 4. As the supercharging pressure increases, the cylinder pressure increases. The injection pressure is regulated by controlling the fuel pressure-feeding device 62 so that the common rail pressure coincides with the target pressure.

If the oxygen concentration is decreased, the ignition delay is lengthened. As the injection pressure is increased, the atomization of the fuel is promoted and formation of the premixed gas is promoted. Therefore, the ignition delay can be regulated so that the ratio of the pre-ignition injection quantity Qp to the total injection quantity Qt falls within the predetermined range by increasing the injection pressure.

Figure 9:
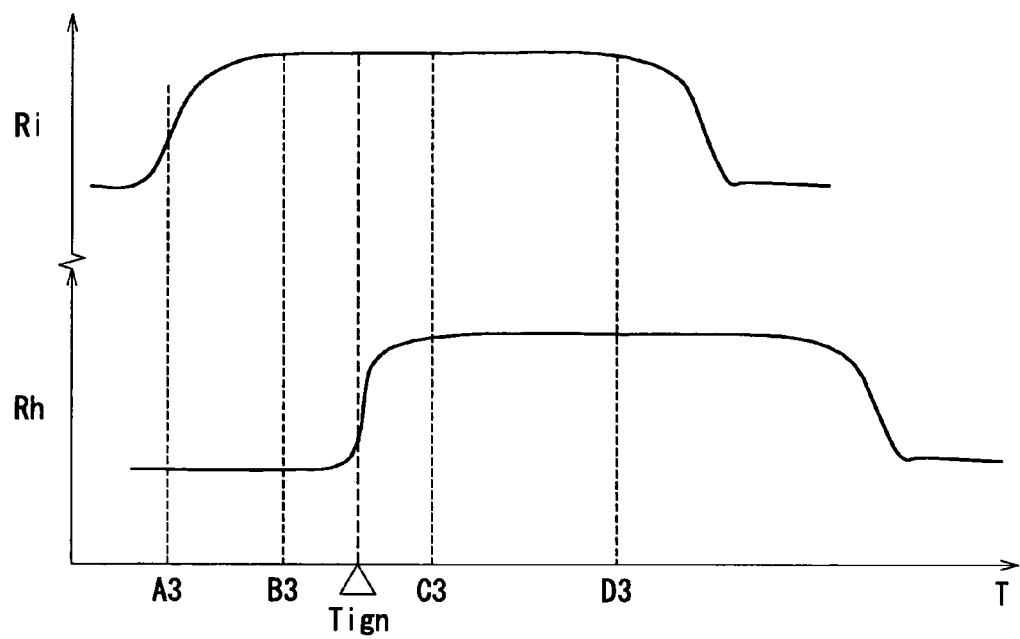
FIG. 9 is a time chart showing a fuel injection operation of the engine according to the embodiment.
Figures 10A, 10B, 10C, 10D:
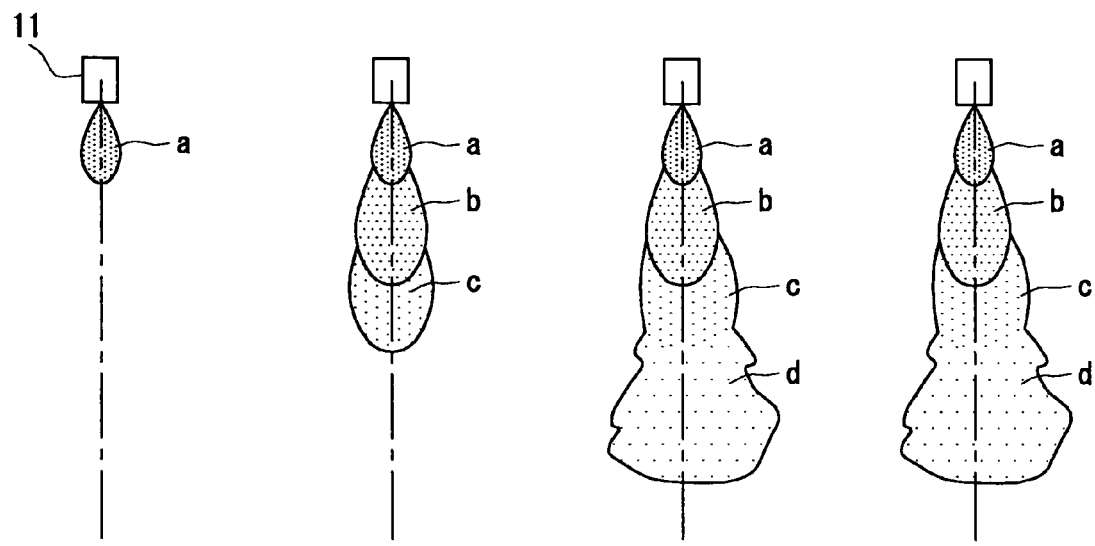
FIG. 10A is a schematic diagram showing a fuel injection operation of the engine according to the embodiment.
FIG. 10B is a schematic diagram showing a fuel injection operation of the engine according to the embodiment.
FIG. 10C is a schematic diagram showing a fuel injection operation of the engine according to the embodiment.
FIG. 10D is a schematic diagram showing a fuel injection operation of the engine according to the embodiment.
Figure 11:
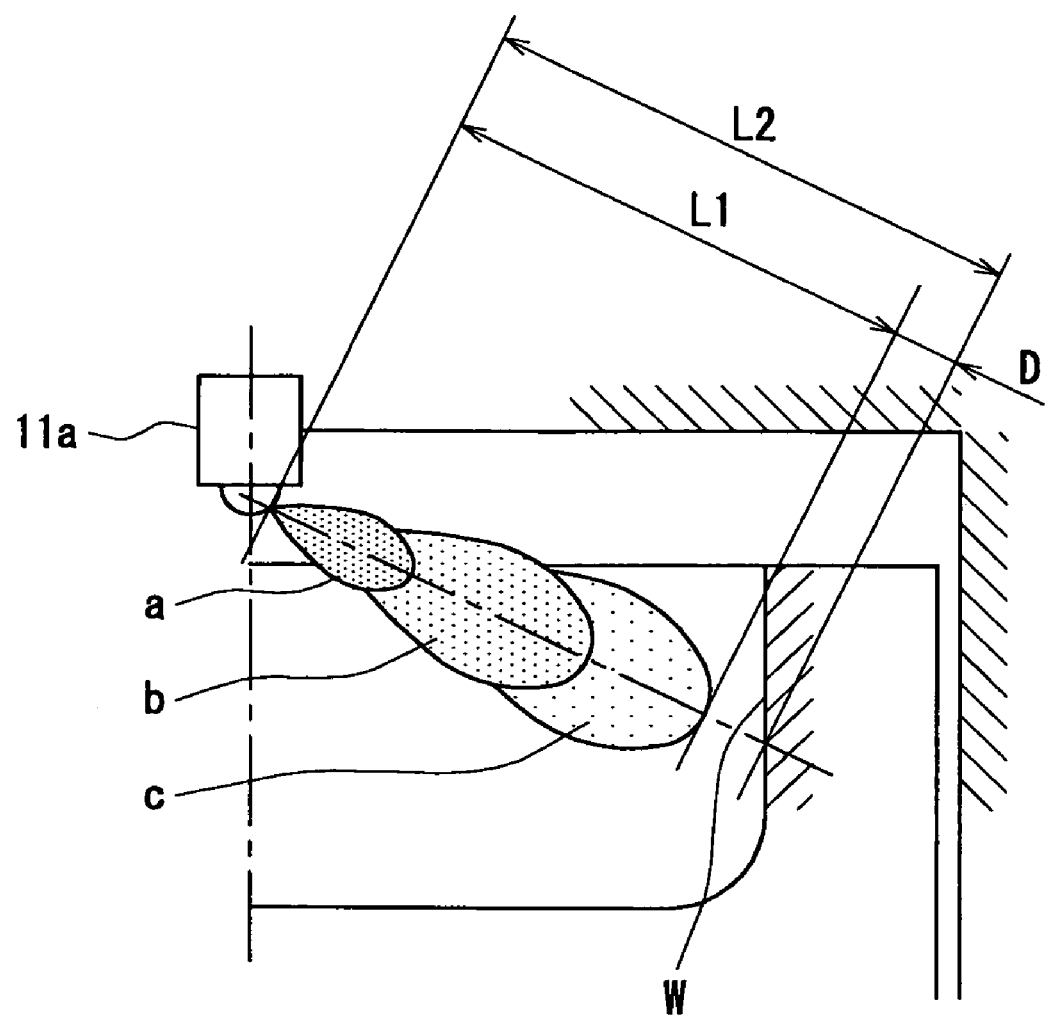
FIG. 11 is a schematic diagram showing fuel spray control of the engine according to the embodiment.

Next, a fuel injection mode of the injector 11 in the case where the above control of the cylinder oxygen concentration and the ignition delay is performed will be explained based on FIGS. 9 to 10D. A state of the fuel injection at a time point A3 in FIG. 9 is shown in FIG. 10A. A state of the fuel injection at a time point B3 in FIG. 9 is shown in FIG. 10B. A state of the fuel injection at a time point C3 in FIG. 9 is shown in FIG. 10C. A state of the fuel injection at a time point D3 in FIG. 9 is shown in FIG. 10D. The spray of the fuel exists in the form of a group of liquid droplets in an early stage of the injection as shown by an area "a" in FIG. 10A. As the spray recedes from the injection holes, the atomization and the vaporization progress and the fuel is mixed with the air more. Thus, the fuel and the air are equalized and formation of the mixed gas of the fuel and the air is promoted. As explained above, the nozzle structure of the injector 11 does not hinder the atomization and the penetration force of the fuel. The injected fuel moves as a whole along the central lines of the injection holes 831a–833a or the injection holes 831b, 832b for each one of the injection hole groups 83a, 83b. Since the spray of the fuel has the sufficient penetration force, there exists clear tendency that the mixed state of the fuel and the air is more equalized as the fuel recedes from the injection holes 831a–832b. The fuel is atomized and vaporized in an area "b" in FIG. 10B, 10C or 10D. Since the atomization is not hindered, the premixed gas can be formed before the fuel reaches a wall W of the combustion chamber facing the injection holes 831a–832b as shown in FIG. 11. The premixed gas is formed in an area "c" in FIG. 10B, 10C or 10D. The premixed gas is combusted in an area "d" in FIG. 10C or 10D.

In order to form the premixed gas before the fuel reaches the combustion chamber wall W facing the injection holes, a certain distance D has to be provided between a tip of the spray formed during the ignition delay and the combustion chamber wall surface W as shown in FIG. 11. The certain distance D should preferably be set within a predetermined range. For instance, the predetermined range of the distance D is defined by a following equation (1).

$$0 < D \leq L1 \times 0.2, \quad (1)$$

In the equation (1), L1 represents a distance between the injection hole of the nozzle 11a and the tip of the spray, and L2 is a distance between the injection hole of the nozzle 11a and the combustion chamber wall W as shown in FIG. 11. The certain distance D is calculated by subtracting the distance L1 from the distance L2.

Figure 4:
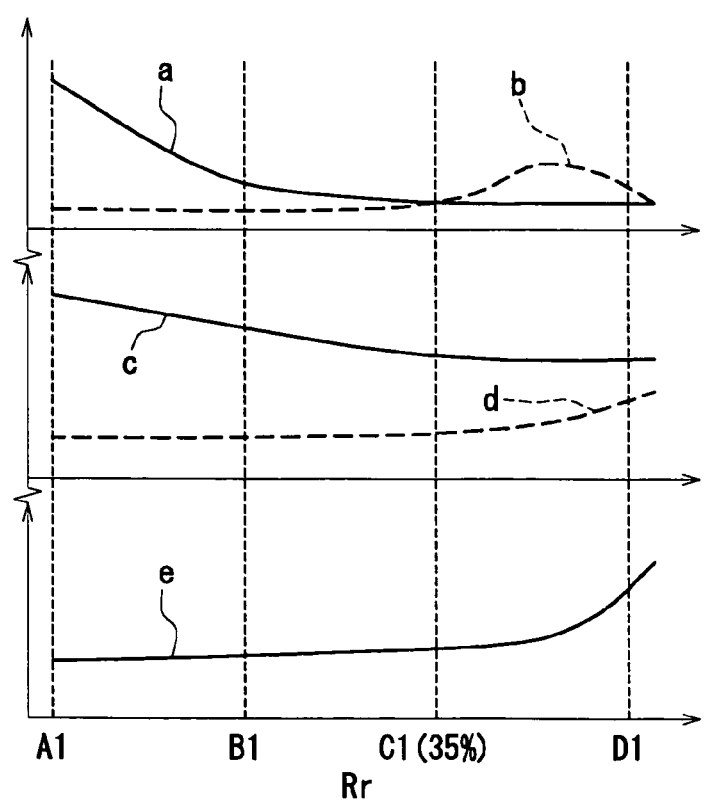
FIG. 4 is a graph showing characteristics of the engine according to the embodiment.
Figure 5A:
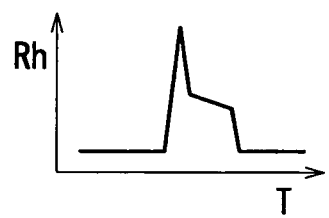
FIG. 5A is a time chart showing a heat release rate pattern of the engine according to the embodiment.
Figure 5B:
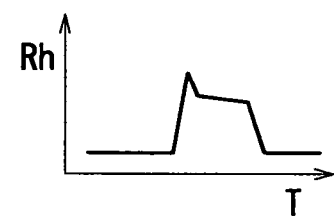
FIG. 5B is a time chart showing a heat release rate pattern of the engine according to the embodiment.
Figure 5C:
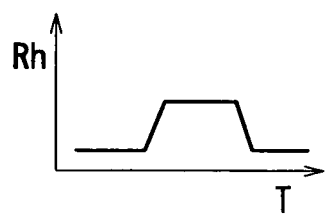
FIG. 5C is a time chart showing a heat release rate pattern of the engine according to the embodiment.
Figure 5D:
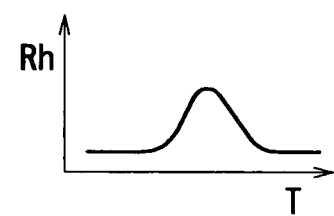
FIG. 5D is a time chart showing a heat release rate pattern of the engine according to the embodiment.
Figure 8D:
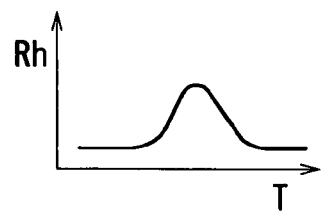
FIG. 8D is a time chart showing a heat release rate pattern of the engine according to the embodiment.

The scale of the combustion space can be regulated by controlling the oxygen concentration. The oxygen concentration can be controlled by regulating the EGR rate Rr. Therefore, the combustion space can be limited within the premixing space so that the combustion space does not expand into a space where the fuel and the air are not mixed sufficiently. Moreover, by controlling the ignition delay, progress speed of the combustion (combustion progress speed) can be regulated. Therefore, speed at which premixed gas is newly formed (premixed gas formation speed) and the combustion progress speed can be equalized. Thus, the premixed gas is supplied to the tip of the fuel spray sequentially as shown in FIGS. 10A to 10D and a constant heat release rate Rh can be provided. Thus, premixed combustion occurs in the premixing space of a constant scale. Thus, the heat release rate Rh remains constant and the heat release rate pattern in the shape of a trapezoid is obtained as shown in FIG. 9. Thus, the reduction of the nitrogen oxides, the noise and the smoke can be achieved at the same time. This effect is achieved when the EGR rate Rr is a certain value C1 as shown in FIGS. 4 and 5C or when the injection timing Tinj is certain timing C2 as shown in FIGS. 7 and 8C. If the EGR rate Rr changes from the certain value C1 or if the injection timing Tinj changes from the certain timing C2, the heat release rate pattern changes from the trapezoidal shape to a profile having a peak in an early stage of the combustion as shown in FIG. 5A, 5B, 8A or 8B, or to a peak-shaped profile as a whole as shown in FIG. 5D or 8D. The heat release rate pattern shown in FIG. 5A is provided when the EGR rate Rr is set at a value A1 in FIG. 4. The heat release rate pattern shown in FIG. 5B is provided when the EGR rate Rr is set at a value B1 in FIG. 4. The heat release rate pattern shown in FIG. 5D is provided when the EGR rate Rr is set at a value D1 in FIG. 4. The heat release rate pattern shown in FIG. 8D is provided when the injection timing Tinj is set at timing D2 shown in FIG. 7.

The distance between each one of the injection holes 831a–832b of the nozzle 11a and the combustion space depends on the ignition delay and the penetration force provided by the nozzle 11a. The penetration force depends on the injection pressure of the fuel. The injection pressure can be changed by regulating the common rail pressure. Therefore, the common rail pressure is set so that the heat release rate Rh is retained constant and the premixed gas is sequentially supplied for the combustion.

If the adjacent sprays interfere with each other because of airflow during the process of forming the premixing space, equally mixed gas cannot be formed and the combustion amount increases. Accordingly, the heat release rate Rh having the trapezoidal profile cannot be obtained and the combustion space expands into the space where the fuel is not mixed with the air sufficiently. As a result, the smoke is deteriorated (increased). Therefore, the interference between the adjacent sprays should be preferably prevented by reducing swirls. A swirl ratio should be preferably set in a range from 0.5 to 2.5.

Figure 12:
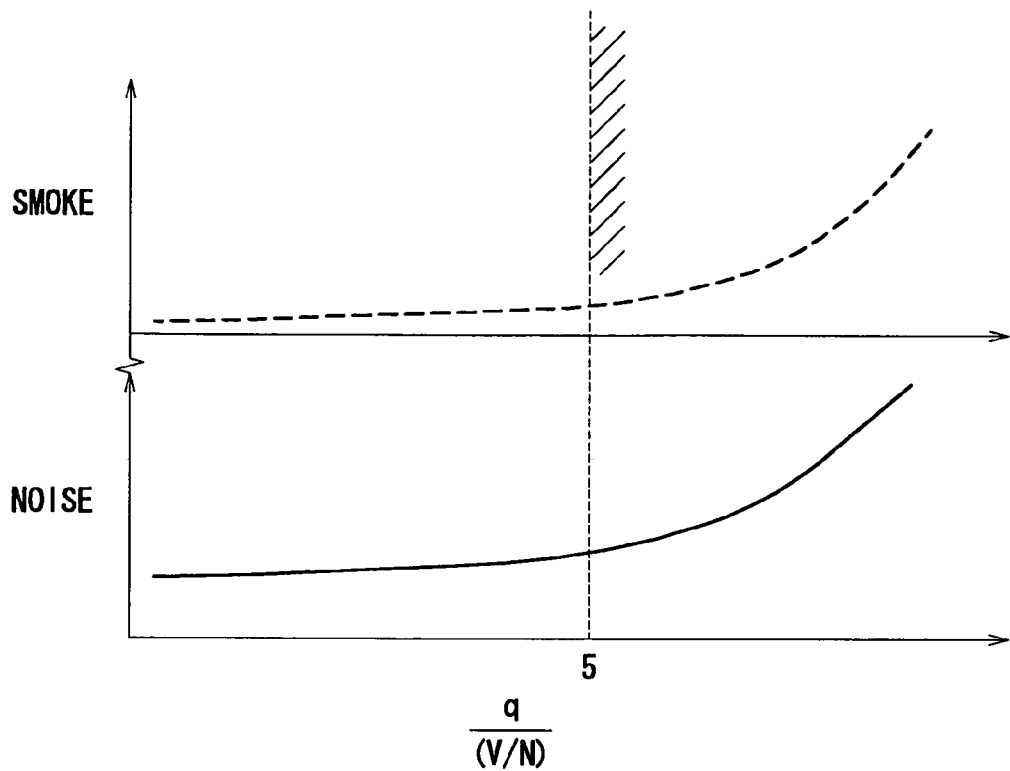
FIG. 12 is a graph showing fuel injection quantity control of the engine according to the embodiment.
Figure 13A:
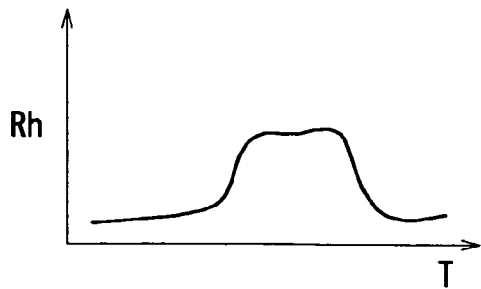
FIG. 13A is a graph showing a heat release rate pattern of the engine according to the embodiment.
Figure 13B:
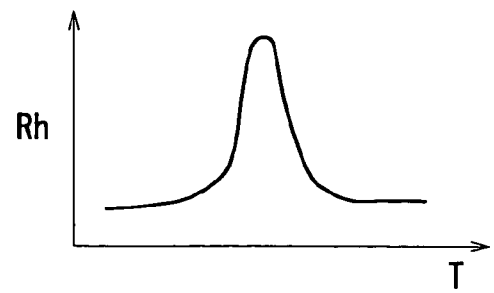
FIG. 13B is a graph showing a heat release rate pattern of the engine according to the embodiment.

In the present embodiment, the injected fuel is diffused and combusted only in the premixing space. If the spray injected from a certain injection hole group interfere with a spray injected from an adjacent injection hole group, the above-explained combustion mode is not established and the combustion amount increases. In this case, the smoke and the noise can be deteriorated (increased). Therefore, in order to prevent the interference between the adjacent sprays, a ratio of the quantity q of the fuel injected from one injection hole group per unit time to a cylinder volume V divided by the number N of the injection hole groups is employed as an index (q/(V/N)), and the index (q/(V/N)) is set within a predetermined range (a range equal to or less than 5 when the unit time is a minute as shown in FIG. 12, for instance). As shown in FIG. 13A, the profile of the heat release rate Rh becomes a trapezoidal shape if the index (q/(V/N)) is set within the predetermined range when the injection timing is set at the TDC and the EGR rate is set at 35%. Thus, the smoke and the noise can be reduced as shown in FIG. 12. If the index (q/(V/N)) is greater than 5, the pattern of the heat release rate Rh becomes the peak-shaped pattern as a whole as shown in FIG. 13B.

In the technology disclosed in Patent Document 1, the fuel is ignited after the injection is finished. Therefore, the scale of the premixing space becomes very large. As a result, a great amount of heat is generated and the noise increases. In contrast, in the present embodiment, the combustion occurs sequentially at a constant ratio. Therefore, the noise is limited to a low level. Moreover, since the fuel to be combusted is already changed into the premixed gas, the generation of the smoke can be inhibited.

In the technology of Patent Document 1, the fuel injected in the early stage of the injection diffuses during the long ignition delay, and the mixed gas becomes excessively lean. As a result, there is a possibility that hydrocarbon or carbon monoxide is formed. In contrast, in the present embodiment, the combustion is performed sequentially from the combustion of the fuel injected and premixed first. Therefore, the formation of the lean premixing space can be prevented. Thus, the formation of the hydrocarbon or the carbon monoxide can be inhibited.

The ignition delay is set so that the ratio of the pre-ignition injection quantity Qp to the total injection quantity Qt falls within a predetermined range "B" shown in FIG. 14. A point "c" in FIG. 14 represents the ratio (1.0) of the pre-ignition injection quantity Qp to the total injection quantity Qt in the technology of Patent Document 1. A lifting distance L of the needle 82 and the heat release rate Rh in the operation range B shown in FIG. 14 are shown in FIG. 15B. A period "a" shown in FIG. 15B represents the ignition delay. The lifting distance L of the needle 82 and the heat release rate Rh in the operation range "A" shown in FIG. 14 are shown in FIG. 15A. The lifting distance L of the needle 82 and the heat release rate Rh in the operation range "C" shown in FIG. 14 are shown in FIG. 15C. If the ignition delay is short, or if the ratio of the pre-ignition injection quantity Qp to the total injection quantity Qt is small, the premixing space is small. In this case, the fuel is ignited before the fuel is mixed with the cylinder gas sufficiently, and a large quantity of the fuel is injected after the ignition. Therefore, the cylinder temperature increases and the combustion space expands into the space where the fuel is not mixed with the cylinder gas sufficiently. As a result, the smoke is generated. If the ignition delay is long, or if the ratio of the pre-ignition injection quantity Qp to the total injection quantity Qt is large, the premixing space is enlarged and a large amount of heat is generated, and the noise is increased. Therefore, the ignition delay is set within the predetermined range determined in accordance with the smoke and the noise, which have a relationship of a trade-off.

The ignition delay is defined based on the ratio of the pre-ignition injection quantity Qp to the total injection quantity Qt. Therefore, when the operating state is in an operation range where the total injection quantity Qt is relatively large, the range of the ignition delay corresponding to the predetermined range of the ratio of the pre-ignition injection quantity Qp to the total injection quantity Qt shifts to a range providing longer ignition delays. When the operating state is in another operation range where the total injection quantity Qt is relatively small, the range of the ignition delay corresponding to the predetermined range of the ratio of the pre-ignition injection quantity Qp to the total injection quantity Qt shifts to a range providing shorter ignition delays. These phenomena indicate that the scale of the premixing space at the ignition start timing increases in the operation range where the total injection quantity Qt is large, and the scale of the premixing space at the ignition start timing decreases in the operation range where the total injection quantity Qt is small. More specifically, the heat release rate Rh is high in the operation range where the total injection quantity Qt is large, and the heat release rate Rh is low in the operation range where the total injection quantity Qt is small. Thus, characteristics that the heat release rate Rh and the noise decrease as the total injection quantity Qt decreases can be obtained. Generally, as the total injection quantity Qt decreases, stricter prevention of the noise is required. The noise reduction effect responsive to a required level can be achieved by the above combustion control.

In the present embodiment, the ratio of the pre-ignition injection quantity Qp to the total injection quantity Qt falls within the range from 0.25 to 0.5, which is defined by the specific numbers. The predetermined range changes in accordance with the structure of the internal combustion engine and the like. For instance, if the fuel injection characteristics of the injector 11 such as the atomization ability or the penetration force are improved, the premixed gas can be formed more quickly. In this case, the predetermined range shifts to a range defined by smaller values.

Figure 16:
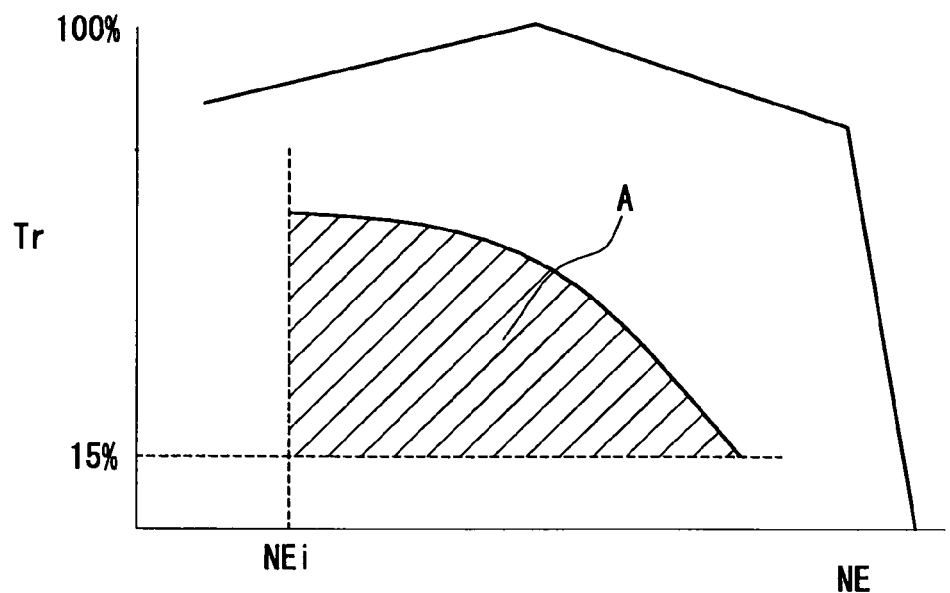
FIG. 16 is a graph showing an operation area for performing combustion control of the engine according to the embodiment.

Next, the predetermined operation area, in which the above combustion control is performed, will be explained based on FIG. 16. The combustion control is performed in a middle-load operation area "A" in FIG. 16. The combustion control is not performed in a high-load operation area or in a low-load operation area. If the engine rotation speed NE is high, the cylinder temperature increases and the ignition timing is advanced. Accordingly, it becomes difficult to set the ratio of the pre-ignition injection quantity Qp to the total injection quantity Qt within the predetermined range. Therefore, the above combustion control is not performed if the rotation speed NE exceeds a predetermined upper limit rotation speed. When the load is low, the cylinder temperature is low and the total injection quantity Qt is small. When the load is high, a large quantity of the fresh air is required. Therefore, in such cases, the EGR rate is set to a low value, so the above combustion control is not performed. It is because the present invention aims to eliminate the problems caused by the EGR, and does not exert sufficient effect even if the present invention is applied when the EGR rate itself is low. In FIG. 16, Tr represents torque outputted by the engine, and NEi is idling rotation speed of the engine.

If the atomized degree of the spray is deteriorated because of deterioration with time, the combustion space expands from the premixing space toward the atomizing space, which is formed upstream of the premixing space along a direction of the spray, under a condition that the cylinder temperature is high. In this case, the spray is combusted in the space where the fuel is not premixed sufficiently, and the smoke can be generated more easily. In the case where the atomized degree is deteriorated, an after injection is performed additionally so that the smoke is combusted at the same time when the fuel injected in the after injection is combusted in the combustion chamber. Thus, the generation of the smoke can be surely inhibited even under the condition that the cylinder temperature is high.

Figure 17A:
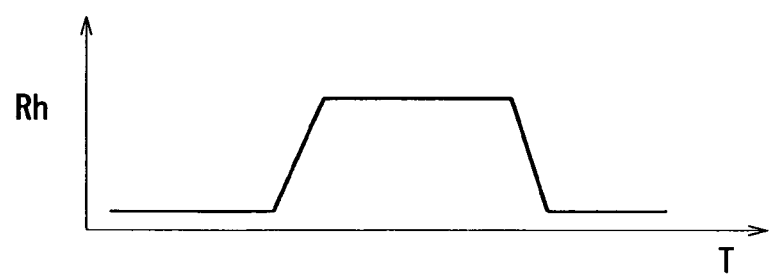
FIG. 17A is a heat release rate pattern of the engine according to the embodiment.
Figure 17B:
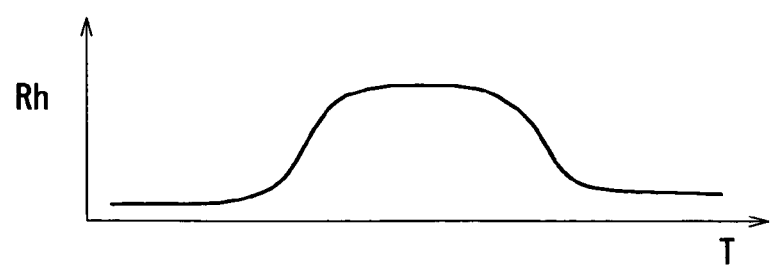
FIG. 17B is a heat release rate pattern of the engine of a modified example of the embodiment.
Figure 17C:
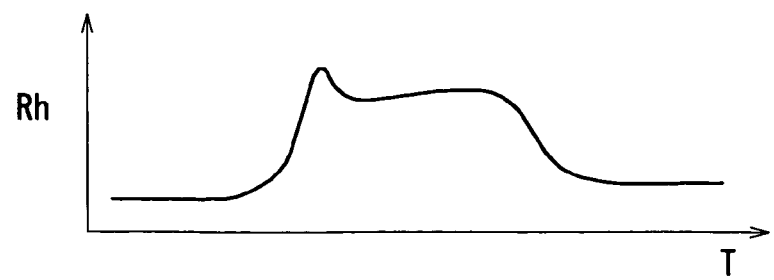
FIG. 17C is a heat release rate pattern of the engine of a modified example of the embodiment.

In addition to the trapezoidal heat release rate pattern shown in FIG. 17A, a heat release rate pattern having substantially no peak such as a pattern formed in the shape of an upside-down bowl as shown in FIG. 17B or a pattern having a small peak in the early stage of the combustion as shown in FIG. 17C can be provided by performing the combustion control of the present embodiment.

The present invention should not be limited to the disclosed embodiment, but may be implemented in many other ways without departing from the spirit of the invention.

What is claimed is:

1. A compression ignition internal combustion engine having an exhaust gas recirculation system for recirculating exhaust gas into an intake system, the engine comprising:
   supplying means for injecting fuel through injection holes at a substantially constant injection rate to atomize the fuel so that the fuel is easily vaporized and to make the fuel penetrate an atmosphere inside a cylinder of the engine, whereby the supplying means provides a spatial distribution of the injected fuel in which mixing of the fuel and air progresses as the fuel recedes from the injection hole along an injection direction and the fuel reaches a premixing space where the fuel is premixed with the air; and
   controlling means for performing combustion control for controlling oxygen concentration inside the cylinder so that a combustion space, in which the fuel is combusted, coincides with the premixing space, and for controlling a delay period extending from an injection start time to an ignition start time of the fuel so that the fuel is ignited while the fuel is injected and so that a ratio of a quantity of the fuel injected before ignition start to a total quantity of the fuel injected during the one injection falls within a predetermined range, wherein the controlling means performs the combustion control so that a pattern of a heat transfer release rate has no peak.

2. The internal combustion engine as in claim 1, wherein the supplying means is formed so that the adjacent injection holes form an injection hole group, wherein central lines of the injection holes belonging to the same injection hole group are directed in substantially the same direction.

3. The internal combustion engine as in claim 1, wherein the controlling means controls a quantity of the recirculated exhaust gas to control the oxygen concentration inside the cylinder.

4. The internal combustion engine as in claim 1, wherein the controlling means controls the period from the injection timing to the ignition timing of the fuel in the combustion control by controlling at least one of the injection timing of the fuel, temperature of the recirculated exhaust gas, temperature of gas taken into the cylinder, a compression ratio, a supercharging pressure and an injection pressure.

5. The internal combustion engine as in claim 1, wherein the controlling means performs the combustion control when a load of the engine is in a certain range between a low-load range and a high-load range and rotation speed of the engine is less than a predetermined rotation speed.

6. The internal combustion engine as in claim 1, wherein the controlling means controls the period from the injection timing to the ignition timing of the fuel so that the ratio of the quantity of the fuel injected before the start of the ignition to the total quantity of the fuel injected during the one injection falls within a range from 25% to 50% in the combustion control.

7. The internal combustion engine as in claim 2, wherein the engine is formed so that a swirl ratio of the engine is set in a range from 0.5 to 2.5.

8. The internal combustion engine as in claim 2, wherein the engine is formed with a plurality of injection hole groups, and
the engine is formed so that a ratio of a quantity of the fuel injected through one of the injection hole groups per minute to a volume of the cylinder divided by the number of the injection hole groups is set at 5 or under.

9. The internal combustion engine as in claim 1, wherein the controlling means performs the combustion control so that a speed at which the premixing space is newly formed and a speed at which the fuel is combusted after ignition start are equalized and so that a constant heat release rate is provided.

10. The internal combustion engine as in claim 1, wherein the heat release rate pattern is substantially in the shape of a trapezoid.

11. A fuel injection and ignition control method for a compression ignition internal combustion engine having an exhaust gas recirculation system for recirculating exhaust gas into an intake system, the method comprising:

injecting fuel through injection holes at a substantially constant injection rate to atomize the fuel so that the fuel is easily vaporized and to make the fuel penetrate an atmosphere inside a cylinder of the engine, whereby a spatial distribution of the injected fuel is provided in which mixing of the fuel and air progresses as the fuel recedes from the injection hole along an injection direction and the fuel reaches a premixing space where the fuel is premixed with the air;

performing combustion control for controlling oxygen concentration inside the cylinder so that a combustion space, in which the fuel is combusted, coincides with the premixing space; and controlling a delay period extending from an injection start time to an ignition start time of the fuel so that the fuel is ignited while the fuel is injected and so that a ratio of a quantity of the fuel injected before ignition start to a total quantity of the fuel injected during the one injection falls within a predetermined range, wherein the combustion control is performed so that a pattern of a heat transfer release rate has no peak.

12. The method as in claim 11, wherein
said performing combustion control comprises controlling a quantity of the recirculated exhaust gas to control the oxygen concentration inside the cylinder.

13. The method as in claim 11, wherein
the delay period is controlled by controlling at least one of the injection timing of the fuel, temperature of the recirculated exhaust gas, temperature of gas taken into the cylinder, a compression ratio, a supercharging pressure and an injection pressure.

14. The method as in claim 11, wherein
the combustion control is performed when a load of the engine is in a certain range between a low-load range and a high-load range and rotation speed of the engine is less than a predetermined rotation speed.

15. The method as in claim 11, wherein
the delay period is controlled so that the ratio of the quantity of the fuel injected before the start of the ignition to the total quantity of the fuel injected during the one injection falls within a range from 25% to 50% in the combustion control.

16. The method as in claim 11, wherein
the combustion control is performed so that a speed at which the premixing space is newly formed and a speed at which the fuel is combusted after ignition start are equalized and so that a constant heat release rate is provided.

17. The method as in claim 11, wherein the heat release rate pattern is substantially in the shape of a trapezoid.

* * * * *